(12) United States Patent
Trainin et al.

(10) Patent No.: US 9,325,455 B2
(45) Date of Patent: *Apr. 26, 2016

(54) DEVICE, SYSTEM AND METHOD OF COMMUNICATING AGGREGATE DATA UNITS

(71) Applicant: INTEL CORPORATION, Santa Clara, CA (US)

(72) Inventors: Solomon B. Trainin, Haifa (IL); Carlos Cordeiro, Portland, OR (US); Ran Mor, Herzlia (IL); Michael Glik, Kfar Saba (IL)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/572,967

(22) Filed: Dec. 17, 2014

(65) Prior Publication Data

US 2015/0098461 A1 Apr. 9, 2015

Related U.S. Application Data

(63) Continuation of application No. 13/534,011, filed on Jun. 27, 2012, now Pat. No. 8,948,089.

(60) Provisional application No. 61/585,350, filed on Jan. 11, 2012, provisional application No. 61/648,124, filed on May 17, 2012.

(51) Int. Cl.
*H04L 1/16* (2006.01)
*H04L 1/18* (2006.01)
(Continued)

(52) U.S. Cl.
CPC ............ *H04L 1/1621* (2013.01); *H04L 1/1614* (2013.01); *H04L 1/1887* (2013.01); *H04W 24/02* (2013.01); *H04W 72/0406* (2013.01); *H04W 28/065* (2013.01)

(58) Field of Classification Search
CPC ........ H04W 4/00; H04W 72/14; H04W 72/02
USPC .................................................. 370/328, 329
See application file for complete search history.

(56) References Cited

U.S. PATENT DOCUMENTS

| 7,454,517 B2 | 11/2008 | Ha et al. |
| 7,817,610 B2 | 10/2010 | Naka et al. |

(Continued)

OTHER PUBLICATIONS

IEEE Std 802.11n™-2009, IEEE Standard for Information technology• Telecommunications and information exchange between systems• Local and metropolitan area networks• Specific requirements, Part 11: Wireless LAN Medium Access Control (MAC) and Physical Layer (PHY) Specifications, Amendment 5: Enhancements for Higher Throughput, Oct. 29, 2009, 536 pages.

(Continued)

*Primary Examiner* — Edan Orgad
*Assistant Examiner* — Emmanuel Maglo
(74) *Attorney, Agent, or Firm* — Shichrur & Co.

(57) ABSTRACT

Some demonstrative embodiments include devices, systems and/or methods of communicating aggregate data units. For example, a device may include a wireless communication unit to communicate an aggregate data unit including a plurality of data units in an increasing order of sequence numbers assigned to the data units, such that a first data unit having a first sequence number always precedes a second data unit having a second sequence number, greater than the first sequence number.

29 Claims, 5 Drawing Sheets

(51) Int. Cl.
*H04W 24/02* (2009.01)
*H04W 72/04* (2009.01)
*H04W 28/06* (2009.01)

(56) References Cited

U.S. PATENT DOCUMENTS

| | | | |
|---|---|---|---|
| 8,416,803 | B1 | 4/2013 | Basson et al. |
| 8,630,272 | B2 | 1/2014 | Park et al. |
| 8,743,804 | B2 | 6/2014 | Wu |
| 8,817,698 | B2 | 8/2014 | Gong et al. |
| 8,948,089 | B2 | 2/2015 | Trainin et al. |
| 2005/0238016 | A1 | 10/2005 | Nishibayashi et al. |
| 2005/0265297 | A1 | 12/2005 | Nakajima et al. |
| 2006/0034174 | A1 | 2/2006 | Nishibayashi et al. |
| 2006/0083233 | A1* | 4/2006 | Nishibayashi ........ H04L 1/1621 370/389 |
| 2006/0092871 | A1 | 5/2006 | Nishibayashi et al. |
| 2006/0187951 | A1 | 8/2006 | Ginzburg et al. |
| 2006/0291436 | A1 | 12/2006 | Trainin |
| 2007/0011554 | A1 | 1/2007 | Trainin et al. |
| 2007/0058605 | A1 | 3/2007 | Meylan et al. |
| 2007/0186134 | A1 | 8/2007 | Singh et al. |
| 2007/0201364 | A1 | 8/2007 | Nakajima et al. |
| 2007/0206508 | A1 | 9/2007 | Sammour et al. |
| 2007/0237169 | A1* | 10/2007 | Trainin ............... H04L 12/4035 370/458 |
| 2009/0040990 | A1 | 2/2009 | Xhafa et al. |
| 2009/0059877 | A1 | 3/2009 | Utsunomiya et al. |
| 2009/0063804 | A1 | 3/2009 | Trainin |
| 2010/0002646 | A1 | 1/2010 | Nishibayashi et al. |
| 2010/0150082 | A1 | 6/2010 | Shin et al. |
| 2010/0260114 | A1 | 10/2010 | Vermani et al. |
| 2011/0026505 | A1 | 2/2011 | Trainin |
| 2011/0188424 | A1* | 8/2011 | Ramamurthy ...... H04W 28/065 370/311 |
| 2011/0199971 | A1* | 8/2011 | Kim .................... H04W 28/065 370/328 |
| 2012/0014335 | A1* | 1/2012 | Adachi ................ H04W 48/08 370/329 |
| 2012/0117446 | A1* | 5/2012 | Taghavi Nasrabadi ............. H04L 1/0003 714/776 |
| 2012/0207087 | A1 | 8/2012 | Wentink et al. |
| 2012/0314694 | A1 | 12/2012 | Hsieh |
| 2013/0028243 | A1 | 1/2013 | Wentink et al. |

OTHER PUBLICATIONS

Cordeiro et al., "IEEE P802.11 Wireless LANs: PHY/MAC Complete Proposal Specification", IEEE 802.11-10/0433r2, May 18, 2010, pp. 1-335.
International Search Report and Written Opinion for International Application No. PCT/US2013/020860, mailed on Apr. 29, 2013, 12 pages.
Stacey et al., "IEEE P802.11 Wireless LANs: Specification Framework for TGac", IEEE 802.11-09/0992r21, Jan. 19, 2011, pp. 1-50.
Wireless Gigabit Alliance (WGA) Specifications; WiGig MAC and PHY Specification Version 1.0, Apr. 2010—Final Specification; 311 pages.
IEEE Std 802.11•-2007 (Revision of IEEE Std 802.11-1999) IEEE Standard for Information technology—Telecommunications and information exchange between systems—Local and metropolitan area networks—Specific requirements. Part 11: Wireless Lan Medium Access Control (MAC) and Physical Layer (PHY) Specifications, Jun. 12, 2007,1232 pages.
International Preliminary Report on Patentability and Written Opinion for International Patent Application No. PCT/US2013/020860, mailed on Jul. 24, 2014, 8 pages.
Office Action for U.S. Appl. No. 13/534,011, mailed on Dec. 10, 2013, 13 pages.
Final Office Action for U.S. Appl. No. 13/534,011, mailed on Jul. 3, 2014, 21 pages.
U.S. Appl. No. 14/572,954, filed on Dec. 17, 2014, 34 pages.
Office Action for U.S. Appl. No. 14/572,954, mailed on May 1, 2015, 15 pages.
Notice of Allowance for U.S. Appl. No. 14/572,954, mailed Aug. 14, 2015, 12 pages.

* cited by examiner

DEVICE, SYSTEM AND METHOD OF COMMUNICATING AGGREGATE DATA UNITS

CROSS REFERENCE

This application is a Continuation Application of U.S. patent application Ser. No. 13/534,011, filed on Jun. 27, 2012, which claims the benefit of and priority from U.S. Provisional Patent Application No. 61/585,350, entitled "Fast block ACK and Unicast Contention Based Access Period", filed Jan. 11, 2012, and from U.S. Provisional Patent Application No. 61/648,124, entitled "Device, System and Method of Block Acknowledgement", filed May 17, 2012, the entire disclosures of all of which are incorporated herein by reference.

BACKGROUND

A first wireless communication device may transmit an aggregate data unit including a plurality of data units to a second wireless communication device. For example, the first wireless communication device may transmit an aggregate medium access control (MAC) protocol data unit (MPDU) (A-MPDU) including an aggregation of a plurality of MPDUs.

The second wireless communication unit may successfully receive one or more of the MPDUs, and may transmit back to the first wireless communication device an acknowledgment, e.g., a block acknowledgement (BA), acknowledging the successfully received MPDUs.

The first wireless communication device may retransmit one or more MPDUs, which were not acknowledged by the BA, e.g., as part of a subsequent A-MPDU.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
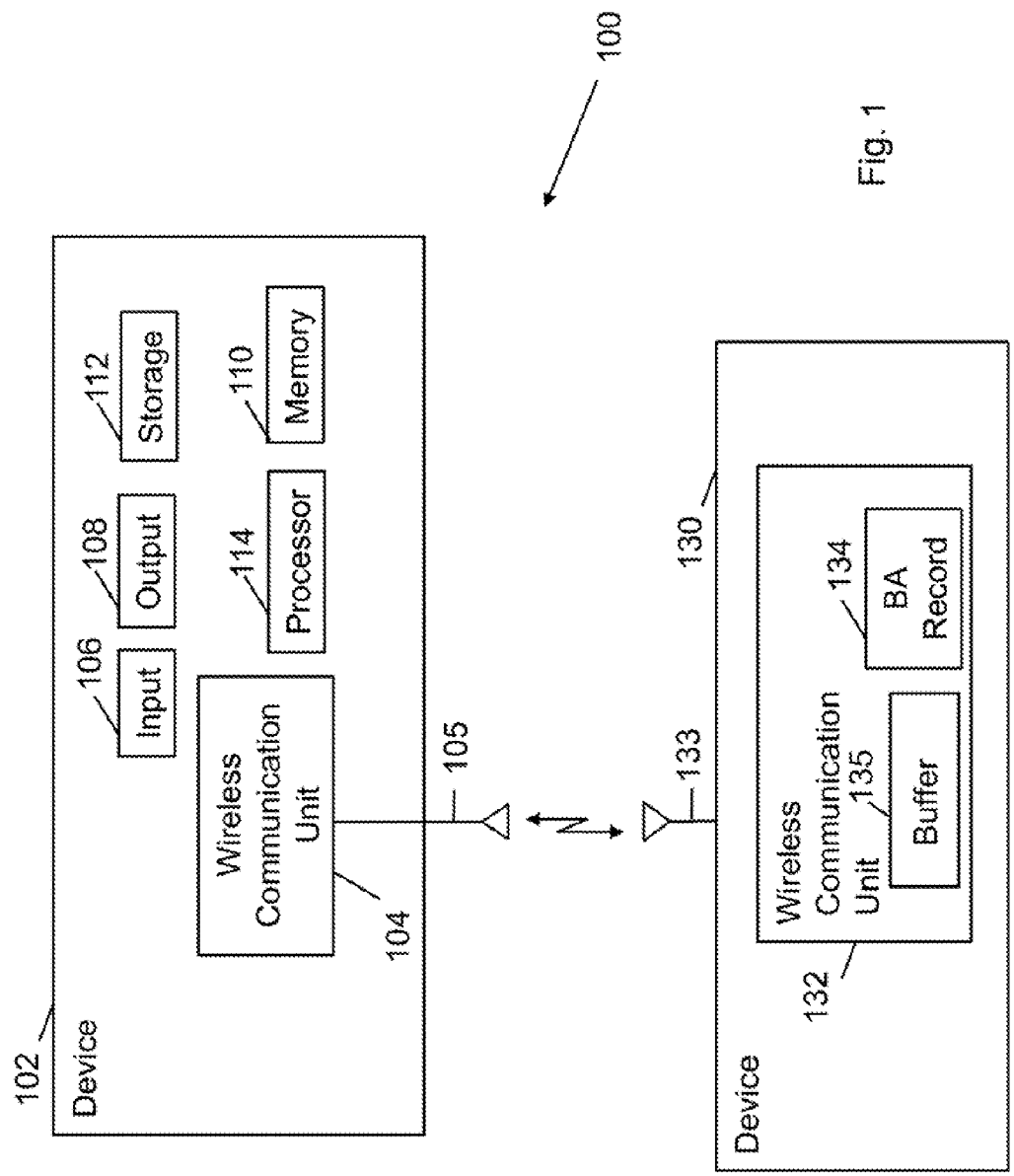
FIG. 1 is a schematic block diagram illustration of a system in, accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing Wireless-Gigabit-Alliance (WGA) specifications (*Wireless Gigabit Alliance, Inc WiGig MAC and PHY Specification Version* 1.0, April 2010, *Final specification*) and/or future versions and/or derivatives thereof, devices and/or networks operating in accordance with existing IEEE 802.11 standards (IEEE 802.11-2012 *IEEE Standard for Information Technology—Telecommunications and information exchange between systems—Local and metropolitan area networks—Specific requirements, Part* 11*: Wireless LAN Medium Access Control (MAC) and Physical Layer (PHY) Specifications; IEEE*802.11 *task group ac (TGac)* ("*IEEE*802.11-09/0308*r*12—*TGac Channel Model Addendum Document*"), *IEEE* 802.11 *task group ad (TGad)* (*IEEE P*802.11*ad/D*8.0 *Draft Standard for Information Technology—Telecommunications and Information Exchange Between Systems—Local and Metropolitan Area Networks— Specific Requirements—Part* 11*: Wireless LAN Medium Access Control (MAC) and Physical Layer (PHY) Specifications—Amendment* 5*: Enhancements for Very High Throughput in the* 60 *GHz Band*), and/or future versions and/or derivatives thereof, devices and/or networks operating in accordance with existing IEEE 802.16 standards (*IEEE-Std*

802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, devices and/or networks operating in accordance with existing Wireless— WirelessHD™ specifications and/or future versions and/or derivatives thereof, units and/or devices which are part of the above networks, one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee, Ultra-Wideband (UWB), Global System for Mobile communication (GSM), 3G, 3.5G, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some demonstrative embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mmwave) frequency band), e.g., a frequency band within the frequency band of between 30 Ghz and 300 GHZ, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. For example, the antenna may include at least one of a phased array antenna, a single element antenna, a set of switched beam antennas, and the like.

The term "station" (STA), as used herein, may include any logical entity that is a singly addressable instance of a medium access control (MAC) and a physical layer (PHY) interface to a wireless medium (WM).

The phrase "access point" (AP), as used herein, may include an entity that contains one station (STA) and provides access to distribution services, via the WM for associated STAs.

The phrase "non-access-point (non-AP) station (STA)", as used herein, may relate to a STA that is not contained within an AP.

The term "beamforming", as used herein, may relate to a spatial filtering mechanism, which may be used at a transmitter to improve the received signal power or signal-to-noise ratio (SNR) at an intended receiver.

The phrases "directional multi-gigabit (DMG)" and "directional band (DBand)", as used herein, may relate to a frequency band wherein the Channel starting frequency is above 56 GHz.

The phrases "DMG STA" and "mmWave STA (mSTA)" may relate to a STA having a radio transmitter, which is operating on a channel that is within the DMG band.

The phrase "aggregate data unit", as used herein, may relate to frame, which includes an aggregation of a plurality of data units.

The phrase "aggregate medium access control (MAC) protocol data unit (MPDU) (A-MPDU)", as used herein, may relate to a frame including an aggregation of a plurality of MPDUs.

The phrase "aggregate MAC service data unit (MSDU) (A-MSDU)", as used herein, may relate to a frame including an aggregation of a plurality of MSDUs.

The phrase "Block Acknowledgement (ACK) (BA or BACK)", as used herein, may relate to a frame configured to acknowledge successful receipt of a communication. For example, the BACK may be configured to acknowledge successful receipt of one or more data units of an aggregate data unit.

Reference is now made to FIG. 1, which schematically illustrates a block diagram of a system 100, in accordance with some demonstrative embodiments.

As shown in FIG. 1, in some demonstrative embodiments, system 100 may include a wireless communication network including one or more wireless communication devices, e.g., wireless communication devices 102 and/or 130, capable of communicating content, data, information and/or signals over one or more suitable wireless communication links, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, wireless communication devices 102 and/or 130 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, wireless communication devices 102 and/or 130 may include wireless communication units 104 and/or 132, respectively, to perform wireless communication with wireless communication devices 102 and/or 130, respectively, and/or with one or more other wireless communication devices, e.g., as described below.

Wireless communication devices 102 and/or 130 may also include, for example, one or more of a processor 114, an input unit 106, an output unit 108, a memory unit 110, and a storage unit 112. Wireless communication devices 102 and/or 130 may optionally include other suitable hardware components and/or software components. In some demonstrative embodiments, some or all of the components of one or more of wireless communication devices 102 and/or 130 may be enclosed in a common housing or packaging, and may be interconnected or operably associated using one or more wired or wireless links. In other embodiments, components of one or more of wireless communication devices 102 and/or 130 may be distributed among multiple or separate devices.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102 and/or 130 and/or of one or more suitable applications.

Input unit 106 includes, for example, a keyboard, a keypad, a mouse, a touch-pad, a track-ball, a stylus, a microphone, or other suitable pointing device or input device. Output unit 108 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 112 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication devices 102 and/or 130.

In some demonstrative embodiments, wireless communication units 104 and 132 may include, or may be associated with, one or more antennas 105 and 133, respectively. Antennas 105 and/or 133 may include any type of antennas suitable for transmitting and/or receiving wireless communication signals, blocks, frames, transmission streams, packets, messages and/or data. For example, antennas 105 and/or 133 may include any suitable configuration, structure and/or arrangement of one or more antenna elements, components, units, assemblies and/or arrays. Antennas 105 and/or 133 may include, for example, antennas suitable for directional communication, e.g., using beamforming techniques. Antennas 105 and/or 133 may include an antenna covered by a quasi-omni antenna pattern. For example, antennas 105 and/or 133 may include at least one of a phased array antenna, a single element antenna, a set of switched beam antennas, and the like. In some embodiments, antennas 105 and/or 133 may implement transmit and receive functionalities using separate transmit and receive antenna elements. In some embodiments, antennas 105 and/or 133 may implement transmit and receive functionalities using common and/or integrated transmit/receive elements.

In some demonstrative embodiments, wireless communication units 104 and/or 132 include, for example, one or more radios, e.g., wireless transmitters, receivers and/or transceivers, able to send and/or receive wireless communication signals, RF signals, frames, blocks, transmission streams, packets, messages, data items, and/or data. For example, wireless communication units 104 and/or 132 may include or may be implemented as part of a wireless Network Interface Card (NIC), and the like.

In some demonstrative embodiments, wireless communication devices 102 and 130 may establish a wireless communication link. The link may include an uplink and/or a downlink. The downlink may include, for example, a unidirectional link from an AP to one or more non-AP stations (STAs) or a unidirectional link from a non-AP Destination STA to a non-AP Source STA. The uplink may include, for example, a unidirectional link from a non-AP STA to an AP or a unidirectional link from a non-AP Source STA to a non-AP Destination STA.

In some demonstrative embodiments, wireless communication devices 102 and/or 130 may perform the functionality of DMG stations. For example, wireless communication devices 102 and/or 130 may be configured to communicate over the DMG band.

In some demonstrative embodiments, a first wireless communication device ("originator") of system 100 may transmit one or more aggregate data units to a second wireless communication device ("recipient") of system 100, e.g., as described in detail below.

For example, wireless communication device 102 may perform the functionality of an originator STA and may transmit an aggregate data unit, e.g., an A-MPDU or an A-MSDU, to wireless communication device 130, which may perform the functionality of a recipient STA.

In some demonstrative embodiments, the originator and recipient may utilize a block acknowledgment scheme to enable the recipient to acknowledge successful receipt of one or more data units from the originator.

In some demonstrative embodiments, the recipient, e.g., wireless communication device 130, may transmit a block acknowledgement (BA or BACK) back to the originator to acknowledge successful receipt of one or more of the data units of the aggregate data unit, e.g., as described in detail below.

In some demonstrative embodiments, the originator, e.g., wireless communication device 102, may retransmit one or more data units of the aggregate data unit, which were not acknowledged by the recipient, e.g., as described in detail below.

In some demonstrative embodiments, the originator, e.g., wireless communication device 102, may prepare for transmission one or more additional data units to be transmitted to the recipient, e.g., wireless communication device 130, for example, as part of a subsequent aggregate data unit.

In some demonstrative embodiments, a Sequence Number (SN) may be assigned to each data unit. For example, a STA transmitting a data unit, e.g., an MSDU, an A-MSDU, or a MAC management protocol data unit (MMPDU), may assign a SN to the transmitted data unit. For example, a data unit, e.g., an MSDU, an A-MSDU, or an MMPDU, may include a Sequence Number field indicating the sequence number of the data unit.

In some demonstrative embodiments, the recipient, e.g., wireless communication device 130, may be configured to forward successfully received data units for processing by a higher layer, e.g., a next MAC process, for example, according to an increasing order of the SN of the data units. For example, wireless communication unit 132 may be configured to forward a data unit having a first SN, which was successfully received from wireless communication unit 104, for further processing by a higher layer of wireless communication device 130, after a data unit having a second SN, lesser than the first SN, was already sent for further processing.

In some demonstrative embodiments, the additional data units may have SNs greater than the SNs of the retransmitted data units.

In some demonstrative embodiments, the originator, e.g., wireless communication device 102, may prepare the additional data units, e.g., such that one or more of the additional data units may be ready for transmission prior to receiving the BACK from the recipient.

In some demonstrative embodiments, transmitting the additional data units, prior to transmitting the retransmitted data units may result in latency in the processing of the data units by the recipient. For example, the recipient may not be able to forward the additional data units for processing by a next MAC process, prior to successfully receiving the retransmitted data units, e.g., since the SNs of the additional data units may be greater than the SNs of the retransmitted data units.

In some demonstrative embodiments, wireless communication units 104 and/or 132 may communicate an aggregate data unit, e.g., an A-MPDU, including a plurality of data units, e.g., a plurality of MPDUs, in an increasing order of sequence numbers assigned to the data units, such that a first data unit having a first sequence number always precedes a second data unit having a second sequence number, greater than the first sequence number.

For example, wireless communication unit 104 may construct an A-MPDU including MPDUs in, e.g., strict, increasing order of SN, and transmit the A-MPDU to wireless communication unit 132, e.g., over the DMG band. Wireless communication unit 132 may successfully receive one or more MPDUs of the A-MPDU, e.g., as described below with reference to FIGS. 2, 3 and/or 4.

In some demonstrative embodiments, the originator STA, e.g., wireless communication unit 104, may only transmit a frame, which requires a response from the recipient, at the beginning of a new transmission period, e.g., a Transmit Opportunity (TxOP) or a Service Period (SP), which is separated from a previous transmission period, for example, by more than a short-interframe-space (SIFS) time or a reduced-interframe-space (RIFS) time.

For example, the originator STA, e.g., wireless communication unit 104, may not start a new TxOP or a SP with an MPDU or an A-MPDU, which has an ACK policy other than a normal ACK, e.g., if at least one frame transmitted by the originator to the recipient in the last PPDU did not require an immediate response.

In one example, wireless communication unit 104 may transmit one or more data units, e.g., an MPDU, a MMPDU and/or an A-MPDU, which require immediate response at a start of a TxOP.

In some demonstrative embodiments, the aggregate data unit may include at least one retransmitted data unit, which was previously communicated as part of a previous aggregate data unit.

In some demonstrative embodiments, the at least one retransmitted data unit may include at least one data unit, which was not acknowledged by a BACK corresponding to the previous aggregate data unit.

For example, wireless communication unit 104 may construct the A-MPDU including one or more MPDUs, which were previously communicated by wireless communication unit 104 as part of a previous A-MPDU and were not acknowledged by a BACK transmitted by wireless communication unit 132 in response to the previous A-MPDU.

In some demonstrative embodiments, wireless communication unit 104 may construct the A-MPDU such that the at least one retransmitted data unit may precede any data unit of the aggregate data unit, which was not previously transmitted, e.g., as described below with reference to FIGS. 2, 3 and/or 4.

In some demonstrative embodiments, the aggregate data unit may include a plurality of retransmitted data units, which may be ordered in the aggregate data unit according to an increasing order of sequence numbers assigned to the plurality of retransmitted data units.

For example, an originator STA, e.g., wireless communication unit 104, may receive a BACK from a recipient STA, e.g., wireless communication unit 132. The BACK may acknowledge the successful receipt of one or more of the MPDUs by the recipient STA, while one or more other MPDUs may not be acknowledged. In response to the BACK, the originator STA may first retransmit the unacknowledged MPDUs, for example, in increasing order of the SN, e.g., prior to transmitting additional MPDUs, which may have SNs which are greater than the SNs of the retransmitted MPDUs.

In some demonstrative embodiments, the originator STA, e.g., wireless communication unit 104, may intentionally skip the transmission of one or more data units. For example, wireless communication unit 104 may decide not to transmit a particular data unit ("the intentionally skipped data unit"), e.g., if a lifetime of the particular data unit has expired, if a predefined retransmission threshold was reached with respect to the particular data unit, and/or based on any other criteria.

In some demonstrative embodiments, the recipient STA, e.g., wireless communication unit 132, may be configured to detect that a data unit, which was not received, was indeed intentionally skipped, for example, at a time of receiving a successive data unit, e.g., as described in detail below.

In some demonstrative embodiments, the recipient STA, e.g., wireless communication unit 132, may be configured to expect an upcoming data unit to be received by the recipient STA to have a particular SN. For example, the originator STA, e.g., wireless communication unit 104, may be assumed to transmit the data units according to the increasing order of the SNs, e.g., as described above. Accordingly, the recipient STA may expect to receive a data unit having a SN ("the expected SN"), which is immediately successive to a SN of a previously received data unit.

In one example, wireless communication unit 132 may expect to receive a data unit having a sequence number i+1 immediately successive to receiving a data unit having a sequence number i.

In some demonstrative embodiments, the recipient STA, e.g., wireless communication unit 132, may receive a data unit ("the unexpected data unit") having a SN greater than the expected SN. For example, wireless communication unit 132 may receive a data unit having the sequence number i+2, e.g., when expecting to receive a data unit having the sequence number i+1.

In some demonstrative embodiments, the recipient STA, e.g., wireless communication unit 132, may be configured to determine whether the originator STA intentionally skipped the transmission of the data unit with the expected SN, or whether the originator STA actually performed the transmission of the data unit with the expected SN but, for some reason, the recipient STA did not successfully receive the data unit with the expected SN, e.g., as described below with reference to FIGS. 2, 3 and/or 4.

In some demonstrative embodiments, the recipient STA, e.g., wireless communication unit 132, may select to forward the unexpected data unit for processing by a higher layer, for example, if the recipient STA has determined that the originator STA has intentionally skipped the transmission of the data unit with the expected SN.

Alternatively, the recipient STA, e.g., wireless communication unit 132, may select not to forward the unexpected data unit for processing by a higher layer, for example, if the recipient STA has determined that the recipient STA did not successfully receive the data unit with the expected SN, although the originator STA actually performed the transmission of the data unit with the expected SN.

In some demonstrative embodiments, wireless communication unit 132 may be configured to maintain a block acknowledgement record 134 and a receive reordering buffer 135, which may be responsible for reordering data units, e.g., MSDUs or A-MSDUs of the successfully received MPDUs, such that MSDUs or A-MSDUs may be eventually passed up to the next MAC process in order of received SN.

In some demonstrative embodiments, block acknowledgement record 134 may include a bitmap of buffered data units of one or more previously received aggregate data units, e.g., buffered MSDUs or A-MSDUs that have been received, but not yet passed up to the next MAC process, indexed according to sequence numbers of the buffered data units. Block acknowledgement record 134 may also include a sequence number indicator, denoted $WinStart_B$, indicating the value of the SN of a data unit, which has not yet been received by the recipient STA. Block acknowledgement record 134 may also include a sequence number indicator, denoted $WinStart_R$, representing a lowest sequence number position in the bitmap.

In some demonstrative embodiments, wireless communication unit 132 may process one or more buffered data units in order of increasing value of the sequence numbers of the one or more buffered data units, starting with a buffered data unit having a sequence number equal to the sequence number indicator $WinStart_B$.

In some demonstrative embodiments, the sequence number indicator $WinStart_B$ may indicate the expected SN to be received by wireless communication unit 132. Accordingly, wireless communication unit 132 may pass a buffered data unit for processing by the next MAC process, e.g., if the SN of the buffered data unit is equal to the sequence number indicator $WinStart_B$, e.g., if $SN=WinStart_B$.

In some demonstrative embodiments, wireless communication unit 132 may determine whether or not wireless communication unit 104 has intentionally skipped at least one data unit ("the missing data unit") having at least one SN lesser than the SN of the buffered data unit, for example, if the SN of the buffered data unit is greater than the sequence number indicator $WinStart_B$, e.g., if $SN>WinStart_B$.

In some demonstrative embodiments, wireless communication unit 132 may determine that the missing data unit was intentionally skipped and, accordingly, may determine to process the buffered data unit having a sequence number greater than the sequence number indicator. For example, wireless communication unit 132 may determine that the missing data unit was intentionally skipped, if a data unit immediately preceding the buffered data unit was successfully received and any delimiter values between the buffered data unit and the immediately preceding data unit are valid, e.g., as described below.

In some demonstrative embodiments, wireless communication unit 132 may determine that the missing data unit was not intentionally skipped and, accordingly, may determine to wait to successfully receive the missing data unit before processing the buffered data unit. For example, wireless communication unit 132 may determine that the missing data unit was not intentionally skipped, if the data unit immediately preceding the buffered data unit was not successfully received and/or any delimiter values between the buffered data unit and the immediately preceding data unit are not valid.

In some demonstrative embodiments, wireless communication unit 132 may pass one or more MSDUs or A-MSDUs up to the next MAC process, for example, if they are stored in buffer 135 in order of increasing value of the SN subfield starting with the MSDU or A-MSDU that has $SN=WinStart_B$.

In some demonstrative embodiments, wireless communication unit 132 may pass one or more MSDUs or A-MSDUs up to the next MAC process, for example, if $SN>WinStart_B$, and the MPDU is received as a non first frame in the A-MPDU; the bit at position $SN=WinStart_R-1$ is set to 1 and all delimiters between the received MPDU and the preceding MPDU ($SN=WinStart_R-1$) are valid.

In some demonstrative embodiments, wireless communication unit 132 may pass one or more MSDUs or A-MSDUs up to the next MAC process, for example, if $SN>WinStart_B$, and the MPDU is received as first frame in the A-MPDU; the A-MPDU is received in a short-interframe-space (SIFS) time or a reduced-interframe-space (RIFS) time after an A-MPDU, or in SIFS time after transmission of a BACK frame; the bit at position $SN=WinStart_R-1$ is set to 1 and all delimiters after the MPDU ($SN=WinStart_R-1$) in the preceding A-MPDU are valid.

In some demonstrative embodiments, wireless communication unit 132 may pass one or more MSDUs or A-MSDUs up to the next MAC process, for example, if $SN>WinStart_B$, and the MPDU is received in SIFS or RIFS time after an A-MPDU or in SIFS time after transmission of a BACK frame; the bit at position $SN=WinStart_R-1$ is set to 1 and all delimiters after the MPDU ($SN=WinStart_R-1$) in the preceding A-MPDU are valid.

In some demonstrative embodiments, wireless communication unit 132 may pass one or more MSDUs or A-MSDUs up to the next MAC process, for example, if $SN>WinStart_B$, and the MPDU is received as first frame in the A-MPDU; the A-MPDU is received in SIFS or RIFS time after an MPDU or in SIFS time after transmission of an ACK frame; and the bit at position $SN=WinStart_R-1$ is set to 1.

In some demonstrative embodiments, wireless communication unit 132 may pass one or more MSDUs or A-MSDUs up to the next MAC process, for example, if $SN>WinStart_B$, and the MPDU is received in SIFS or RIFS time after the preceding MPDU or in SIFS time after transmission of an ACK frame; and the bit at position $SN=WinStart_R-1$ is set to 1.

In some demonstrative embodiments, wireless communication unit 132 may continue processing one or more subsequent buffered data units, e.g., sequentially, for example, until there is no buffered MSDU or A-MSDU for the next sequential value of the SN subfield.

Figure 2:
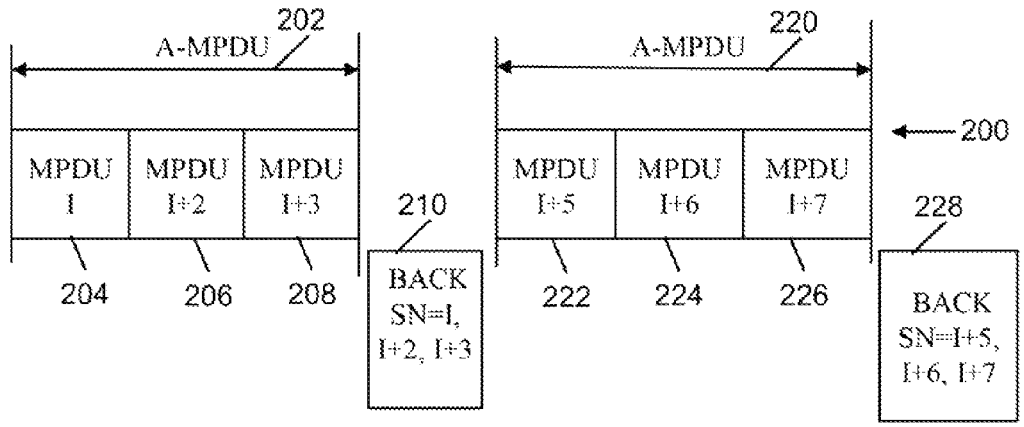
FIG. 2 is a schematic illustration of a sequence of aggregated data units and acknowledgements communicated between first and second wireless communication devices, in accordance with some demonstrative embodiments.

Reference is now made to FIG. 2, which schematically illustrates a sequence 200 of aggregated data units and acknowledgements communicated between first and second wireless communication devices, in accordance with some demonstrative embodiments. In some demonstrative embodiments, sequence 200 may be communicated between an originator STA, e.g., wireless communication unit 104 (FIG. 1), and a recipient STA, e.g., wireless communication unit 132 (FIG. 1).

As shown in FIG. 2, the originator STA may transmit a first A-MPDU 202, e.g., including an MPDU 204, having the sequence number I, an MPDU 206, having the sequence number I+2, and an MPDU 208, having the sequence number I+3. As shown in FIG. 2 the originator STA may intentionally skip the transmission of an MPDU having the sequence number I+1.

According to the demonstrative embodiments of FIG. 2, the recipient STA may successfully receive all three MPDUs 204, 206 and 208 of A-MPDU 202.

According to the demonstrative embodiments of FIG. 2, the recipient STA may detect that the data unit with SN=I+1 is missing, and may determine that the missing data unit was intentionally skipped by the originator STA.

In one example, the recipient STA may determine that the missing data unit with SN=I+1 was intentionally skipped by the originator STA, for example, if the data unit 204 with SN=I, immediately preceding the data unit 206 with SN=I+2, was successfully received and any delimiter values between data units 204 and 206 are valid, e.g., as described above.

Accordingly, the recipient STA may transmit back to the originator STA a BACK 210 indicating the successful receipt of the data units 204, 206 and 208.

As also shown in FIG. 2, after receiving the BACK, the originator STA may transmit a second A-MPDU 220, e.g., including an MPDU 222, having the sequence number I+5, an MPDU 224, having the sequence number I+6, and an MPDU 226, having the sequence number I+7. A shown in FIG. 2 the originator STA may intentionally skip the transmission of an MPDU having the sequence number I+4.

According to the demonstrative embodiments of FIG. 2, the recipient STA may successfully receive all three MPDUs 222, 224 and 226 of A-MPDU 220.

According to the demonstrative embodiments of FIG. 2, the recipient STA may detect that the data unit with SN=I+4 is missing, and may determine that the missing data unit was intentionally skipped by the originator STA.

In one example, the recipient STA may determine that the missing data unit with SN=I+4 was intentionally skipped by the originator STA, for example, if MPDU 222 is received as a first frame in the A-MPDU 220, A-MPDU 220 is received in a SIFS time after transmission of BACK frame 210; the bit at position $SN=WinStart_R-1$ is set to "1" and all delimiters after the MPDU with $SN=WinStart_R-1$, e.g., MPDU 208 in the preceding A-MPDU 202, are valid, e.g., as described above.

Accordingly, the recipient STA may transmit back to the originator STA a BACK 228 indicating the successful receipt of the data units 222, 224 and 226.

Since the recipient STA may determine that the missing MPDUs with SN=I+1 and SN=I+4 have been intentionally skipped by the originator STA, the recipient STA may be able to release the MPDUs 204, 206, 208, 222, 224 and 226 for processing by the upper layer.

Figure 3:
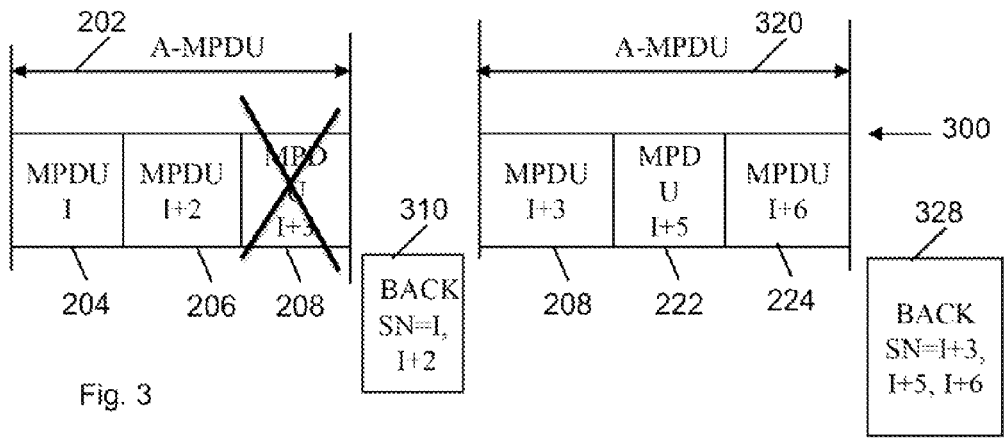
FIG. 3 is a schematic illustration of another sequence of aggregated data units and acknowledgements communicated between first and second wireless communication devices, in accordance with some demonstrative embodiments.

Reference is now made to FIG. 3, which schematically illustrates another sequence 300 of aggregated data units and acknowledgements communicated between first and second wireless communication devices, in accordance with some demonstrative embodiments. In some demonstrative embodiments, sequence 300 may be communicated between an originator STA, e.g., wireless communication unit 104 (FIG. 1), and a recipient STA, e.g., wireless communication unit 132 (FIG. 1).

As shown in FIG. 3, the originator STA may transmit the first A-MPDU 202, e.g., as discussed above with reference to FIG. 2.

According to the demonstrative embodiments of FIG. 3, the recipient STA may successfully receive only MPDUs 204 and 206, e.g., while MPDU 208 may not be successfully received. The recipient STA may detect that the data unit with SN=I+1 is missing, and may determine that the missing data unit was intentionally skipped by the originator STA, e.g., as discussed above with reference to FIG. 2.

Accordingly, the recipient STA may transmit back to the originator STA a BACK 310 indicating the successful receipt of the data units 204 and 206.

As also shown in FIG. 3, after receiving the BACK, the originator STA may transmit a second A-MPDU 320 including a retransmission of the MPDU 208, which was not acknowledged by the BACK. The retransmission of the MPDU 208 may precede any other MPDUs, e.g., the MPDU 222 with SN=I+5, and the MPDU 224 with SN=I+6. The MPDU 226 (FIG. 2) with SN=I+7 may be scheduled for transmission in a next A-MPDU. As shown in FIG. 3, the originator STA may intentionally skip the transmission of an MPDU with SN=I+4.

According to the demonstrative embodiments of FIG. 3, the recipient STA may successfully receive all three MPDUs 208, 222 and 224 of A-MPDU 320.

According to the demonstrative embodiments of FIG. 3, the recipient STA may detect that the data unit with SN=I+4 is missing, and may determine that the missing data unit was intentionally skipped by the originator STA, e.g., as described above.

Accordingly, the recipient STA may transmit back to the originator STA a BACK 328 indicating the successful receipt of the data units 208, 222 and 224.

Since the recipient STA may determine that the missing MPDUs with SN=I+1 and SN=I+4 have been intentionally skipped by the originator STA, the recipient STA may be able to release the MPDUs 204, 206, 208, 222 and 224 for processing by the upper layer.

Referring back to FIG. 1, in some demonstrative embodiments, wireless communication units 104 and 132 may implement a BACK scheme requiring that the recipient STA acknowledge to the originator STA all MPDUs, which are successfully received by the recipient STA.

According to this BACK scheme, the originator, e.g., wireless communication unit 104, may retransmit the MPDUs, which where not successfully received by the recipient, e.g., wireless communication unit 132, as part of a succeeding A-MPDU. As a result the recipient may receive the MPDUs out of order. For example, a first A-MPDUs may include three MPDUs, with three successive SNs SN=I, SN=I+1 and SN=I+2, and the recipient may successfully receive only the MPDUs with SN=I and SN=I+2, while the MPDU with SN=I+2 is not successfully received. The recipient may transmit a BACK acknowledging the successful receipt of the MPDUs with SN=I and SN=I+2. In response, the originator may retransmit the MPDU with SN=I+1 as part of a succeeding A-MPDU, which may also include additional MPDUs, e.g., MPDUs with SN=I+3 and SN=I+4.

In some demonstrative embodiments, the recipient, e.g., wireless communication unit 132, may be required to release the received MPDUs for processing by the upper layer, e.g., in increasing order of SN, as discussed above. The recipient may buffer all successfully received MPDUs, for example, until the MPDUs may be released to the upper layer, e.g., as described above.

In some demonstrative embodiments, the recipient, e.g., wireless communication unit 132, may store in reordering buffer 135 MPDUs with SNs, which are greater than the SN of a SN of a particular MPDU, which was not successfully received, for example, until the particular MPDU is retransmitted and successfully received.

According to the example above, the recipient may not be allowed to release the successfully received MPDU with SN=I+2, e.g., until the retransmitted MPDU with SN=I+1 is successfully received.

Due to the BACK mechanism discussed above, the recipient may be required to utilize a reordering process to maintain and reorder the received MPDUs. The recipient may also be required to maintain a relatively large memory to store the received MPDUs. For example, the size of the reordering buffer 135 may be defined according to the product max_MPDU_size * Reordering_window, wherein max_MPDU_size denotes a maximal MPDU size, and Reordering_window denotes a size of a reordering window. The BACK mechanism may aggregate many long MPDUs, e.g., to provide high link utilization. For example, if the max_MPDU_size is 8 Kilobyte (Kbyte), and the Reordering Window size is 32, then the reordering buffer may have a size of at least 256 Kbyte.

The recipient may also be required to maintain a separate reordering buffer per each BACK agreement. Accordingly, a relatively large amount of memory space may be required to maintain the reordering buffers.

In some demonstrative embodiments, a wireless communication device, e.g., wireless communication device 130, may be configured to transmit a BACK, which may be configured to enable reducing and/or eliminating need of performing the reordering procedure and/or to reduce and/or eliminate the need to allocate the reordering buffers on the recipient, e.g., as described in detail below.

In some demonstrative embodiments, a recipient, e.g., wireless communication unit 132, receiving an aggregate data unit, e.g., an A-MPDU, may be configured to transmit a block acknowledgement including an acknowledgement of a particular data unit of the aggregate data unit, e.g., a particular MPDU of the A-MPDU, only if all other data units of the aggregate data unit, which have sequence numbers lesser than a sequence number of the particular data unit, were successfully received.

For example, the recipient, e.g., wireless communication unit 132, may receive an A-MPDU from an originator, e.g., wireless communication unit 104, and may transmit to the originator a BA including an acknowledgement of a particular MPDU of the A-MPDU, only if all other MPDUS of the A-MPDU, which have sequence numbers lesser than a sequence number of the particular MPDU, were successfully received by the recipient.

In one example, the recipient may be configured to acknowledge only MPDUs that are delivered in the consecutive increasing order of the SNs, and thus may be immediately delivered for processing by the higher level.

This block acknowledgment scheme may differ from a conventional BACK approach, which may mandate acknowledgement of each MPDU successfully delivered to the recipient, e.g., regardless of the SN of the MPDU and/or regardless of whether or not one or more MPDUs with lesser SNs were successfully received. The originator may keep and retransmits the unacknowledged MPDUs, so no MPDU will be missed.

Figure 4:
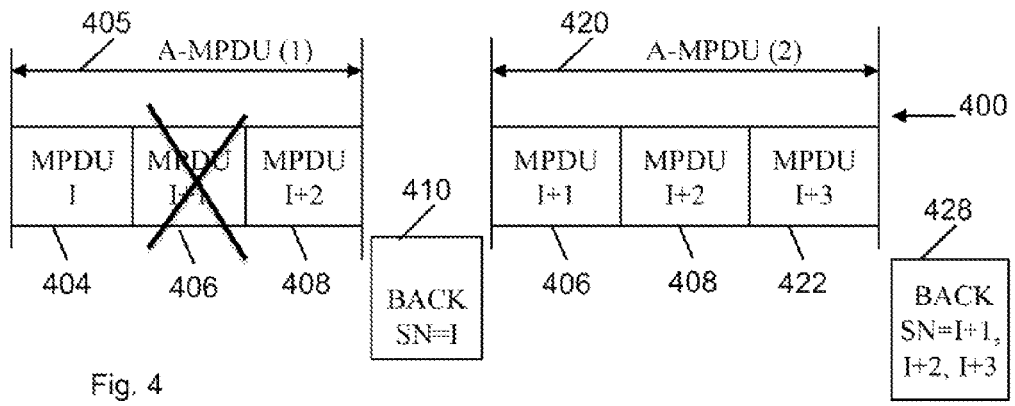
FIG. 4 is a schematic illustration of another sequence of aggregated data units and acknowledgements communicated between first and second wireless communication devices, in accordance with some demonstrative embodiments.

FIG. 4 is a schematic illustration of another sequence 400 of aggregated data units and acknowledgements communicated between first and second wireless communication devices, in accordance with some demonstrative embodiments. In some demonstrative embodiments, sequence 400 may be communicated between an originator STA, e.g., wireless communication unit 104 (FIG. 1), and a recipient STA, e.g., wireless communication unit 132 (FIG. 1).

As shown in FIG. 4, the originator, e.g., wireless communication unit 104 (FIG. 1), may transmit A-MPDUs including MPDUs in strict order of SN. For example, the originator may transmit a first A-MPDU (A-MPDU(1)) 402 including an MPDU with SN=I 404 followed by an MPDU 406 with SN=I+1, which may be followed by an MPDU 408 with SN=I+2.

As shown in FIG. 4, the MPDUs 404 and 408 with SN=I and SN=I+2, respectively, may be successfully received by the recipient, while the MPDU 406 with SN=I+1 may not be successfully received by the recipient.

As shown in FIG. 4, the recipient, e.g., wireless communication unit 132 (FIG. 1), may transmit to the originator a BACK (SN=1) 410, which acknowledges the MPDU 404 with SN=I, which may be released by the recipient to a higher level for processing, while not acknowledging the MPDU 408 with SN=I+2, which cannot be released to the higher level, e.g., due to "hole" in the position of SN=I+1.

It is noted that, in contrast to the conventional BACK scheme, in some demonstrative embodiments, the recipient, e.g., wireless communication unit 132 (FIG. 1), may not acknowledge the MPDU 408 with SN=I+2, even though the MPDU 408 with SN=I+2 was actually successfully received by the recipient.

In some demonstrative embodiments, the reordering buffer of the recipient, e.g., buffer 135 (FIG. 1), may be empty, for example, after the A-MPDU(1) 402 is handled.

As also shown in FIG. 4, upon receiving the block acknowledgment acknowledging only the MPDU 404 with SN=I, the originator, e.g., wireless communication unit 104 (FIG. 1), may build a second, successive, A-MPDU (A-MPDU(2)) 420. The successive A-MPDU 420 may first include the retransmitted, unacknowledged, MPDUs, e.g., the MPDUs 406 and 408 with SN=I+1 and SN=I+2, respectively, followed by one or more new MPDUs, e.g., an MPDU 422 with SN=I+3, as shown in FIG. 4.

In some demonstrative embodiments, the recipient, e.g., wireless communication unit 132 (FIG. 1), may successfully receive, for example, all MPDUs of the second A-MPDU 420. Accordingly, as shown in FIG. 4, the recipient may transmit to the originator a BACK 428 acknowledging all MPDUs were successfully received in order of SNs. The recipient may release all the MPDUs 406, 408 and 422 to the higher level for further processing. The reordering buffer of the recipient may be empty, for example, after the A-MPDU(2) 420 is handled.

In some demonstrative embodiments, the recipient, e.g., wireless communication unit 132 (FIG. 1), may utilize the same reordering buffer, for example, for many different BACK agreements, e.g., since, as discussed above, the reordering buffer is empty after an A-MPDU is handled.

Referring back to FIG. 1, in some demonstrative embodiments, the originator, e.g., wireless communication unit 104, may use the information included in the BACK, e.g., the information indicating which and/or how many MPDUs were successfully received by the recipient, for example, to adapt one or more link condition parameters corresponding to a communication link between the originator and the recipient, e.g., a Modulation and Coding Scheme (MCS).

For example, wireless communication unit 104, may utilize the information regarding the number and/or location of the MPDUs that are actually successfully received by wireless communication unit 132 for link adaptation and/or link management operations.

In some demonstrative embodiments, the recipient, e.g., wireless communication unit 132, may successfully receive a first number of MPDUs, while the block acknowledgement may indicate to the originator that only a second number, lesser than the first number, of MPDUs were successfully received by the recipient, e.g., as described above. As a result the originator may determine erroneous link conditions, e.g., that the link between the originator and recipient is worse than it actually is.

In some demonstrative embodiments, the recipient, e.g., wireless communication unit 132, may include in a BACK corresponding to a particular A-MPDU information indicating how many MPDUs of the A-MPDU were actually successfully received, how many MPDUs of the A-MPDU were actually not successfully received, which MPDUs were successfully received and/or which MPDUs were not successfully received, e.g., in order to enable the originator to determine the link condition parameters based on the actual success of the recipient in receiving the MPDUs.

In some demonstrative embodiments, the recipient, e.g., wireless communication unit 132, may transmit to the originator a block acknowledgment including an indication of a number of data units of the aggregate data unit, which were successfully received but are not acknowledged by the block acknowledgment, e.g., as described below with reference to FIG. 5.

In some demonstrative embodiments, the block acknowledgment may include a subfield including a number of all data units of the aggregate data unit, which were successfully received, e.g., as described below with reference to FIG. 6.

In some demonstrative embodiments, the block acknowledgment may include a Block Ack Bitmap field, which may be configured to include information about the MPDUs successfully received by the recipient, e.g., as described below with reference to FIGS. 5 and 6.

Figure 5:
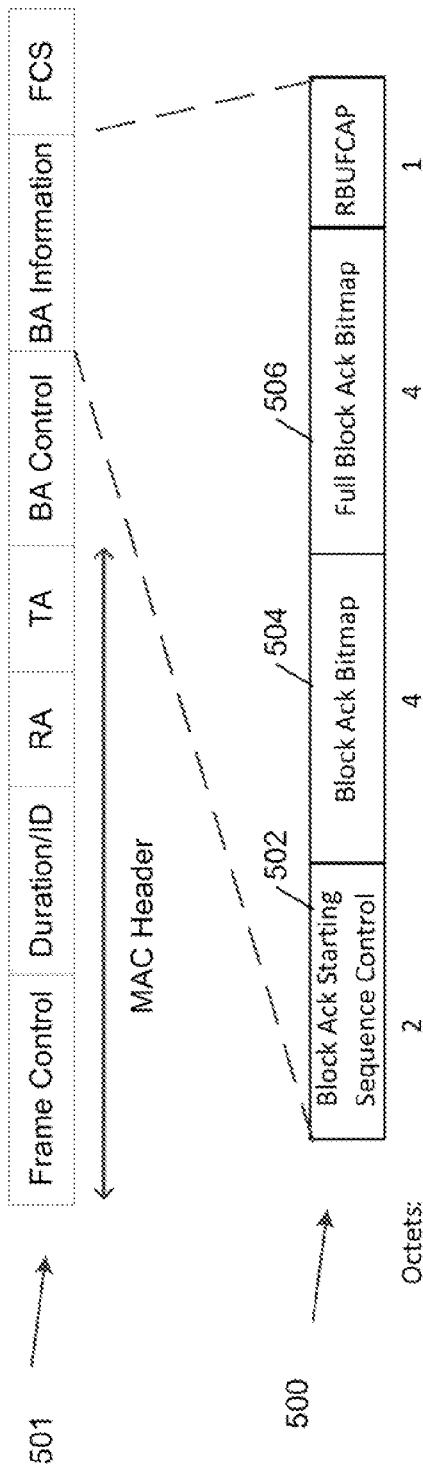
FIG. 5 is a schematic illustration of a block acknowledgement information field, in accordance with some demonstrative embodiments.

FIG. 5 is a schematic illustration of a block acknowledgement information field 500, in accordance with some demonstrative embodiments. In some demonstrative embodiments, field 500 may be included as part of a BACK 501 transmitted by a recipient, e.g., wireless communication unit 132 (FIG. 1), to acknowledge successful receipt of one or more MPDUs of an A-MPDU transmitted by an originator, e.g., wireless communication unit 104 (FIG. 1).

As shown in FIG. 5, field 500 may include a block acknowledgement sequence control subfield 502, e.g., indicating a first SN, followed by a block Ack subfield 504 including an indication of the acknowledged MPDUs. For example, in accordance with the embodiments described above with reference to FIG. 4, field 504 may include an indication of the SN=I.

In some demonstrative embodiments, field 500 may include a Full Block Ack Bitmap subfield 506 indicating the received status of all MPDUs received by the recipient. For example, a bit in the Block Ack Bitmap subfield 506 may be set to a first value, e.g., "1", to acknowledge the successful reception of a single respective MPDU in the order of sequence number. The first bit of Block Ack Bitmap subfield 506 may correspond, for example, to the MPDU with the SN that matches the value of subfield 502. A second value, e.g., "0", may be assigned to a bit to indicate a respective MPDU was not successfully received. For example, in accordance with the embodiments described above with reference to FIG. 4, field 506 may include a bit having the value "1" to indicate the MPDU with SN=I was successfully received, followed by a bit having the value "0" to indicate the MPDU with SN=I+1 was not successfully received, followed a bit having the value "1" to indicate the MPDU with SN=I+2 was successfully received.

Figure 6:
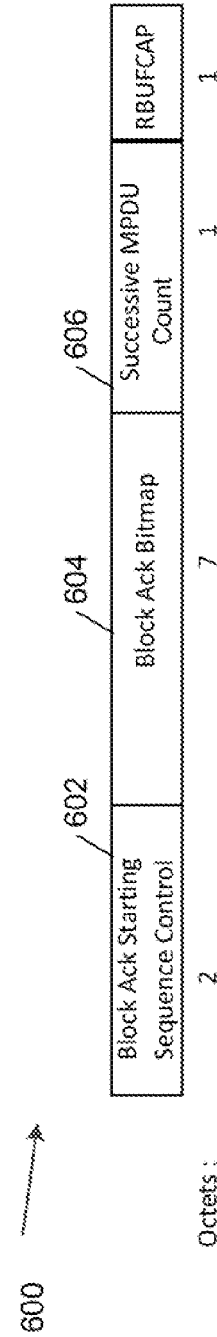
FIG. 6 is a schematic illustration of another block acknowledgement information field, in accordance with some demonstrative embodiments.

FIG. 6 is a schematic illustration of a block acknowledgement information field 600, in accordance with some demonstrative embodiments. In some demonstrative embodiments, field 600 may be included as part of a BACK 602 transmitted by a recipient, e.g., wireless communication unit 132 (FIG. 1), to acknowledge successful receipt of one or more MPDUs of an A-MPDU transmitted by an originator, e.g., wireless communication unit 104 (FIG. 1).

As shown in FIG. 6, field 600 may include a block acknowledgement sequence control subfield 602, e.g., indicating a first SN, followed by a block Ack subfield 604 including a Block Ack Bitmap indicating the acknowledged MPDUs. For example, in accordance with the embodiments described above with reference to FIG. 4, field 604 may include an indication of the SN=I.

In some demonstrative embodiments, field 600 may include a Successive MPDU count subfield 606, e.g., separate from the Block Ack Bitmap of subfield 604. Subfield 606 may include a counter indicative of the number of successfully received MPDUs. The counter may be incremented, for example, for every successful reception of a single MPDU. For example, in accordance with the embodiments described above with reference to FIG. 4, field 606 may include a value indicating the successful reception of two MPDUs, e.g., the MPDUs with SN=I and SN=I+2.

Referring back to FIG. 1, in some demonstrative embodiments, the originator, e.g., wireless communication unit 104, may use the additional information of field 500 (FIG. 5) and/or field 600 (FIG. 6), for example, to make more educated decisions, e.g., to avoid unnecessary link adaptation.

In some demonstrative embodiments, the decision about configuration of the BACK information field of FIGS. 5 and/or 6 may be made and/or negotiated between the originator and recipient, for example, at a BACK agreement establishment phase. For example, wireless communication units 104 and/or 132 may decide to use the BACK information field of FIG. 5, e.g., when a negotiated reordering window size allows including the Full Block Ack bitmap in subfield 506 (FIG. 5). Wireless communication units 104 and/or 132 may decide to use the BACK information field of FIG. 6, e.g., when the negotiated reordering window size does not allow including the Full Block Ack bitmap in subfield 506 (FIG. 5).

Figure 7:
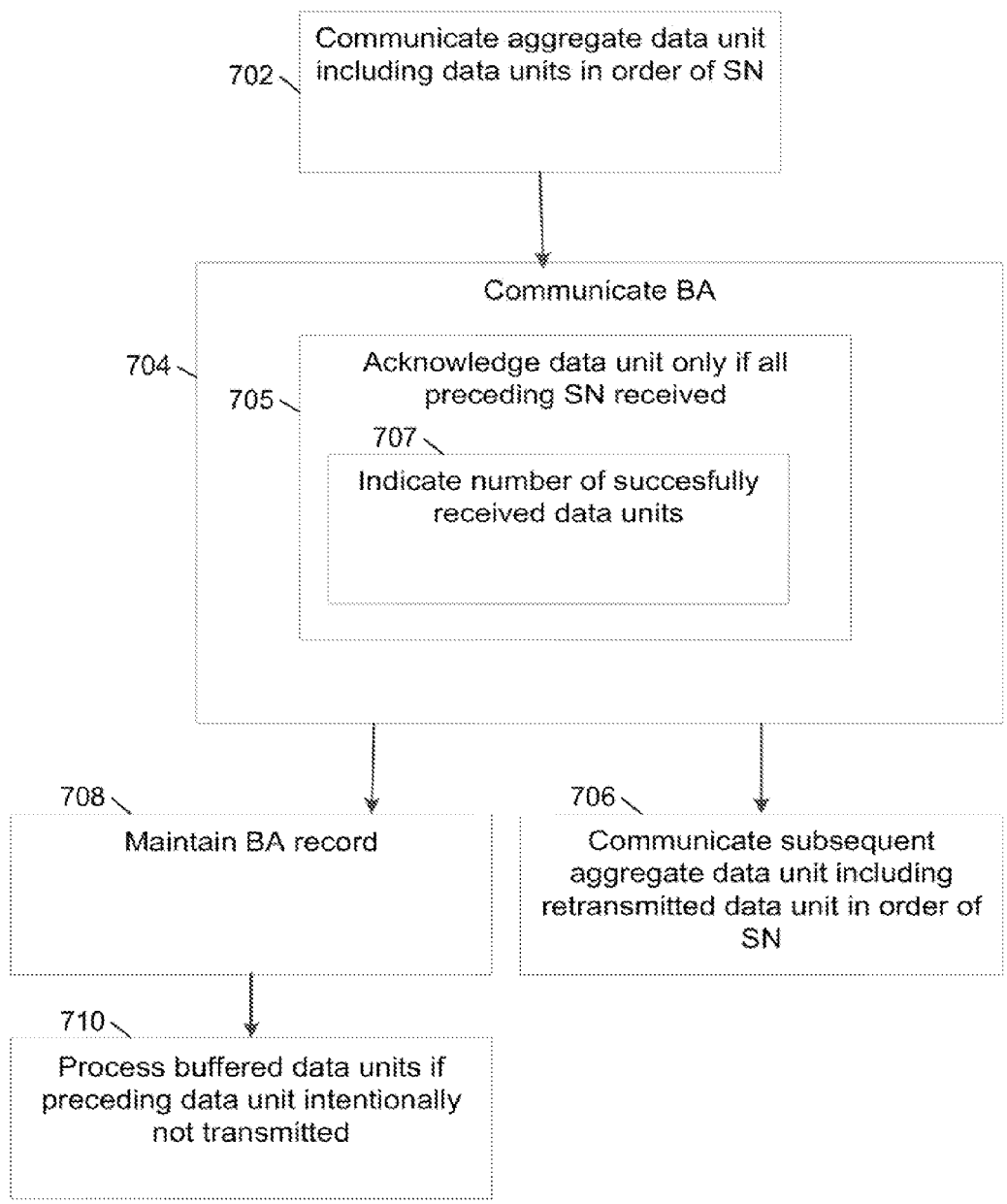
FIG. 7 is a schematic flow-chart illustration of a method of communicating aggregate data units, in accordance with some demonstrative embodiments.

Reference is made to FIG. 7, which schematically illustrates a method of communicating aggregate data units, in accordance with some demonstrative embodiments. In some embodiments, one or more of the operations of the method of FIG. 7 may be performed by a wireless communication system e.g., system 100 (FIG. 1); a wireless communication device, e.g., devices 102 and/or 130 (FIG. 1); and/or a wireless communication unit, e.g., wireless communication units 104 and/or 132 (FIG. 1).

As indicated at block 702, the method may include communicating an aggregate data unit including a plurality of data units in an increasing order of sequence numbers assigned to the data units, such that a first data unit having a first sequence number always precedes a second data unit having a second sequence number, greater than the first sequence number. For example, wireless communication unit 104 (FIG. 1) may transmit an aggregate data unit, e.g., an A-MPDU, including a plurality of data units, e.g., MPDUs, in an increasing order of sequence numbers assigned to the data units and/or wireless communication unit 132 (FIG. 1) may receive an aggregate data unit, e.g., an A-MPDU, including a plurality of data units, e.g., MPDUs, in an increasing order of sequence numbers assigned to the data units, as described above.

As indicated at block 704, the method may include communicating a block acknowledgement including an acknowledgement of one or more data units of the aggregate data unit. For example, wireless communication unit 132 (FIG. 1) may transmit a BACK acknowledging one or more data units of the aggregate data unit and/or wireless communication unit 104 (FIG. 1) may receive the BACK, e.g., as described above.

As indicated at block 705, in some demonstrative embodiments, the block acknowledgement may include an acknowledgement of a particular data unit of the aggregate data unit, only if all other data units of the aggregate data unit, which have sequence numbers lesser than a sequence number of the particular data unit, were successfully received, e.g., as described above.

As indicated at block 707, in some demonstrative embodiments, the block acknowledgement may include an indication of a number of data units of the aggregate data unit, which were successfully received but are not acknowledged by the block acknowledgment. For example, wireless communication unit 132 (FIG. 1) may transmit the BACK including a block acknowledgement information field, e.g., as describes above with reference to FIGS. 5 and/or 6.

As indicated at block 706, the method may include communicating a subsequent aggregate data unit including at least one retransmitted data unit, which was previously communicated as part of the aggregate data unit. For example, wireless communication unit 104 (FIG. 1) transmit a subsequent A-MPDU including one or more MPDUs, which were previously communicated by wireless communication unit 104 (FIG. 1) as part of the previous A-MPDU and were not acknowledged by the BACK transmitted by wireless communication unit 132, e.g., as described above.

As indicated at block 708, the method may include maintaining a block acknowledgement record including a bitmap of buffered data units of one or more previously received aggregate data units, indexed according to sequence numbers of the buffered data units, and a sequence number indicator representing a lowest sequence number in the bitmap. For example, wireless communication unit 132 (FIG. 1) may maintain block acknowledgement record 134 (FIG. 1), e.g., as described above.

As indicated at block 710, the method may include processing one or more buffered data units in order of increasing value of the sequence numbers of the one or more buffered data units starting with a buffered data unit having a sequence number equal to the sequence number indicator.

In some demonstrative embodiments, the processing may include processing a buffered data unit having a sequence number greater than the sequence number indicator, if a data unit immediately preceding the buffered data unit was successfully received and any delimiter values between the buffered data unit and the immediately preceding data unit are valid. For example, wireless communication unit 132 (FIG. 1) may determine whether transmission of a data unit with a SN corresponding to the sequence number indicator was intentionally skipped by wireless communication unit 104 (FIG. 1), e.g., as described above.

Figure 8:
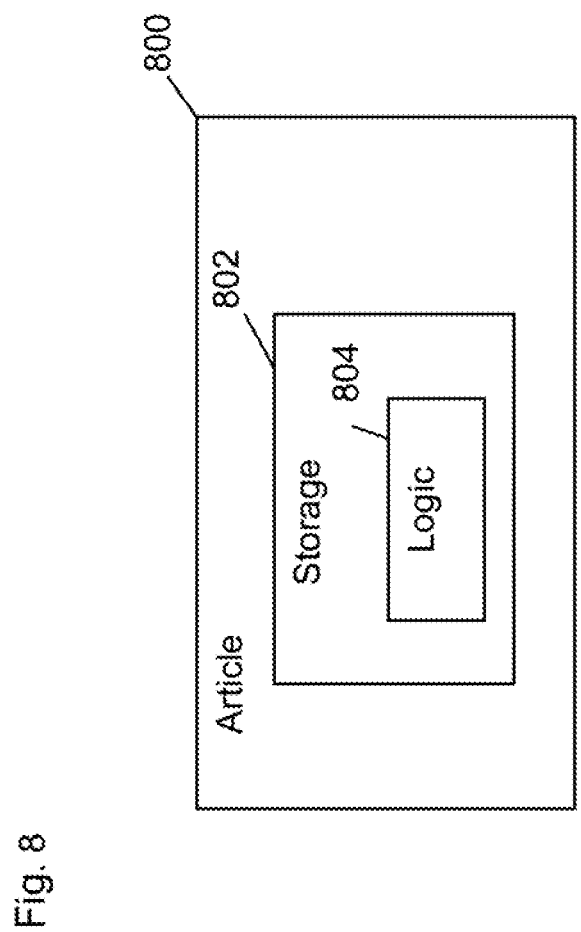
FIG. 8 is a schematic illustration of an article of manufacture, in accordance with some demonstrative embodiments.

Reference is made to FIG. 8, which schematically illustrates an article of manufacture 800, in accordance with some demonstrative embodiments. Article 800 may include a non-transitory machine-readable storage medium 802 to store logic 804, which may be used, for example, to perform at least part of the functionality of wireless communication unit 104 (FIG. 1), wireless communication device 132 (FIG. 1) and/or to perform one or more operations of the method of FIG. 7. The phrase "non-transitory machine-readable medium" is directed to include all computer-readable media, with the sole exception being a transitory propagating signal.

In some demonstrative embodiments, article 800 and/or machine-readable storage medium 802 may include one or more types of computer-readable storage media capable of storing data, including volatile memory, non-volatile memory, removable or non-removable memory, erasable or non-erasable memory, writeable or re-writeable memory, and the like. For example, machine-readable storage medium 802 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 804 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 804 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless apparatus including one or more processors having circuitry, the circuitry to cause a station to:
   buffer a plurality of medium access control (MAC) Service Data Units (MSDUs);
   maintain a Block Acknowledgement (BA) record including a bitmap indexed by sequence number; and
   process one or more of the MSDUs in said buffer if:
      a received MAC Protocol Data Unit (MPDU) is received as a non-first frame of an Aggregate MPDU (A-MPDU);
      a bit at a position $SN=WINStart_R-1$ of said bitmap is set to 1, wherein $WINStart_R$ represents a lowest sequence number position in the bitmap, and SN is a sequence number of the received MPDU; and
      all delimiters between the received MPDU and a preceding MPDU are valid.

2. The wireless apparatus of claim 1, wherein said circuitry is to cause said station to process the one or more MSDUs if:
   the received MPDU is received as a first frame in the A-MPDU;
   the A-MPDU is received in a Short-InterFrame-Space (SIFS) time or a Reduced-InterFrame-Space (RIFS) time after a preceding A-MPDU, or in SIFS time after transmission of a BA frame;
   the bit at the position $SN=WINStart_R-1$ of said bitmap is set to 1; and
   all delimiters after an MPDU in the preceding A-MPDU are valid.

3. The wireless apparatus of claim 1, wherein said circuitry is to cause said station to process the one or more MSDUs if:
   the received MPDU is received in a Short-InterFrame-Space (SIFS) time or a Reduced-InterFrame-Space (RIFS) time after a preceding A-MPDU, or in SIFS time after transmission of a BA frame;
   the bit at the position $SN=WINStart_R-1$ of said bitmap is set to 1; and
   all delimiters after an MPDU in the preceding A-MPDU are valid.

4. The wireless apparatus of claim 1, wherein said circuitry is to cause said station to process the one or more MSDUs if:
   the received MPDU is received as a first frame in said A-MPDU;
   the A-MPDU is received in a Short-InterFrame-Space (SIFS) time or a Reduced-InterFrame-Space (RIFS) time after the preceding MPDU, or in SIFS time after transmission of an Acknowledge (ACK) frame; and
   the bit at the position $SN=WINStart_R-1$ of said bitmap is set to 1.

5. The wireless apparatus of claim 1, wherein said circuitry is to cause said station to process the one or more MSDUs if:
   the received MPDU is received in a Short-InterFrame-Space (SIFS) time or a Reduced-InterFrame-Space (RIFS) time after the preceding MPDU, or in SIFS time after transmission of an Acknowledge (ACK) frame; and
   the bit at the position $SN=WINStart_R-1$ of said bitmap is set to 1.

6. The wireless apparatus of claim 1, wherein said circuitry is to cause said station to process the one or more MSDUs sequentially, until there is no buffered MSDU or Aggregate MSDU (A-MSDU) for a next sequential value of the SN.

7. The wireless apparatus of claim 1, wherein said circuitry is to cause said station to process the one or more MSDUs by passing the one or more MSDUs to a next MAC process.

8. The wireless apparatus of claim 1, wherein said circuitry is to cause said station to process the one or more MSDUs if $SN>WINStart_B$, wherein $WINStart_B$ indicates a value of a sequence number of a MSDU, which has not yet been received.

9. The wireless apparatus of claim 1, wherein said circuitry is to cause said station to receive a plurality of MPDUs in an increasing order of sequence numbers.

10. The wireless apparatus of claim 1, wherein said station is a recipient station.

11. The wireless apparatus of claim 1, wherein said station is a direct multi-gigabit (DMG) station.

12. The wireless apparatus of claim 1 comprising:
   a memory; and
   one or more radios.

13. The wireless apparatus of claim 12 including one or more antennas.

14. A method comprising:
   buffering a plurality of medium access control (MAC) Service Data Units (MSDUs);
   maintaining a Block Acknowledgement (BA) record including a bitmap indexed by sequence number; and
   processing one or more of the MSDUs in said buffer if:
      a received MAC Protocol Data Unit (MPDU) is received as a non-first frame of an Aggregate MPDU (A-MPDU);
      a bit at a position $SN=WINStart_R-1$ of said bitmap is set to 1, wherein $WINStart_R$ represents a lowest sequence number position in the bitmap, and SN is a sequence number of the received MPDU; and
      all delimiters between the received MPDU and a preceding MPDU are valid.

15. The method of claim 14 comprising processing the one or more MSDUs if:
   the received MPDU is received as a first frame in the A-MPDU;

the A-MPDU is received in a Short-InterFrame-Space (SIFS) time or a Reduced-InterFrame-Space (RIFS) time after a preceding A-MPDU, or in SIFS time after transmission of a BA frame;

the bit at the position SN=WINStart$_R$−1 of said bitmap is set to 1; and all delimiters after an MPDU in the preceding A-MPDU are valid.

16. The method of claim 14 comprising processing the one or more MSDUs if:

the received MPDU is received in a Short-InterFrame-Space (SIFS) time or a Reduced-InterFrame-Space (RIFS) time after a preceding A-MPDU, or in SIFS time after transmission of a BA frame;

the bit at the position SN=WINStart$_R$−1 of said bitmap is set to 1; and all delimiters after an MPDU in the preceding A-MPDU are valid.

17. The method of claim 14 comprising processing the one or more MSDUs if:

the received MPDU is received as a first frame in said A-MPDU;

the A-MPDU is received in a Short-InterFrame-Space (SIFS) time or a Reduced-InterFrame-Space (RIFS) time after the preceding MPDU, or in SIFS time after transmission of an Acknowledge (ACK) frame; and the bit at the position SN=WINStart$_R$−1 of said bitmap is set to 1.

18. The method of claim 14 comprising processing the one or more MSDUs if:

the received MPDU is received in a Short-InterFrame-Space (SIFS) time or a Reduced-InterFrame-Space (RIFS) time after the preceding MPDU, or in SIFS time after transmission of an Acknowledge (ACK) frame; and the bit at the position SN=WINStart$_R$−1 of said bitmap is set to 1.

19. The method of claim 14 comprising processing the one or more MSDUs sequentially, until there is no buffered MSDU or Aggregate MSDU (A-MSDU) for a next sequential value of the SN.

20. The method of claim 14 comprising passing the one or more MSDUs to a next MAC process.

21. The method of claim 14 comprising processing the one or more MSDUs if SN>WINStart$_B$, wherein WINStart$_B$ indicates a value of a sequence number of a MSDU, which has not yet been received.

22. A product including one or more tangible computer-readable non-transitory storage media comprising computer-executable instructions operable to, when executed by at least one computer processor, enable the at least one computer processor to implement a method comprising:

buffering a plurality of medium access control (MAC) Service Data Units (MSDUs);

maintaining a Block Acknowledgement (BA) record including a bitmap indexed by sequence number; and processing one or more of the MSDUs in said buffer if:

a received MAC Protocol Data Unit (MPDU) is received as a non-first frame of an Aggregate MPDU (A-MPDU);

a bit at a position SN=WINStart$_R$−1 of said bitmap is set to 1, wherein WINStart$_R$ represents a lowest sequence number position in the bitmap, and SN is a sequence number of the received MPDU; and all delimiters between the received MPDU and a preceding MPDU are valid.

23. The product of claim 22, wherein the method comprises processing the one or more MSDUs if:

the received MPDU is received as a first frame in the A-MPDU;

the A-MPDU is received in a Short-InterFrame-Space (SIFS) time or a Reduced-InterFrame-Space (RIFS) time after a preceding A-MPDU, or in SIFS time after transmission of a BA frame;

the bit at the position SN=WINStart$_R$−1 of said bitmap is set to 1; and all delimiters after an MPDU in the preceding A-MPDU are valid.

24. The product of claim 22, wherein the method comprises processing the one or more MSDUs if:

the received MPDU is received in a Short-InterFrame-Space (SIFS) time or a Reduced-InterFrame-Space (RIFS) time after a preceding A-MPDU, or in SIFS time after transmission of a BA frame;

the bit at the position SN=WINStart$_R$−1 of said bitmap is set to 1; and all delimiters after an MPDU in the preceding A-MPDU are valid.

25. The product of claim 22, wherein the method comprises processing the one or more MSDUs if:

the received MPDU is received as a first frame in said A-MPDU;

the A-MPDU is received in a Short-InterFrame-Space (SIFS) time or a Reduced-InterFrame-Space (RIFS) time after the preceding MPDU, or in SIFS time after transmission of an Acknowledge (ACK) frame; and the bit at the position SN=WINStart$_R$−1 of said bitmap is set to 1.

26. The product of claim 22, wherein the method comprises processing the one or more MSDUs if:

the received MPDU is received in a Short-InterFrame-Space (SIFS) time or a Reduced-InterFrame-Space (RIFS) time after the preceding MPDU, or in SIFS time after transmission of an Acknowledge (ACK) frame; and the bit at the position SN=WINStart$_B$−1 of said bitmap is set to 1.

27. The product of claim 22, wherein the method comprises processing the one or more MSDUs sequentially, until there is no buffered MSDU or Aggregate MSDU (A-MSDU) for a next sequential value of the SN.

28. The product of claim 22, wherein the method comprises passing the one or more MSDUs to a next MAC process.

29. The product of claim 22, wherein the method comprises processing the one or more MSDUs if SN>WINStart$_B$, wherein WINStart$_B$ indicates a value of a sequence number of a MSDU, which has not yet been received.

* * * * *